April 30, 1929.  W. F. BRANDT  1,710,917
LIQUID MEASURING AND DISPENSING APPARATUS
Filed April 18, 1927   3 Sheets-Sheet 3
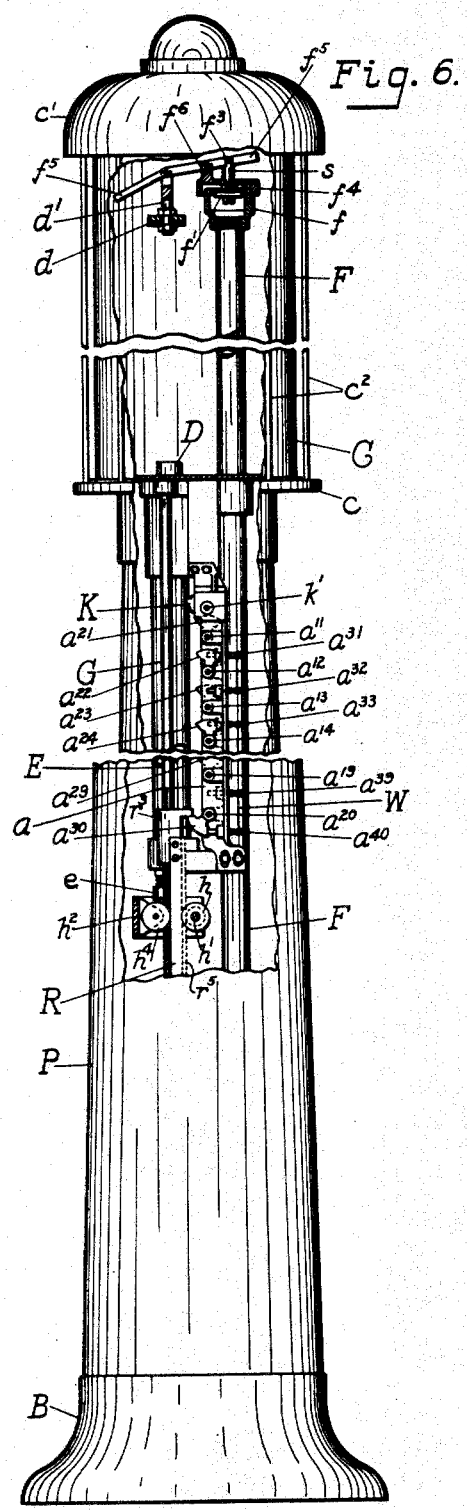
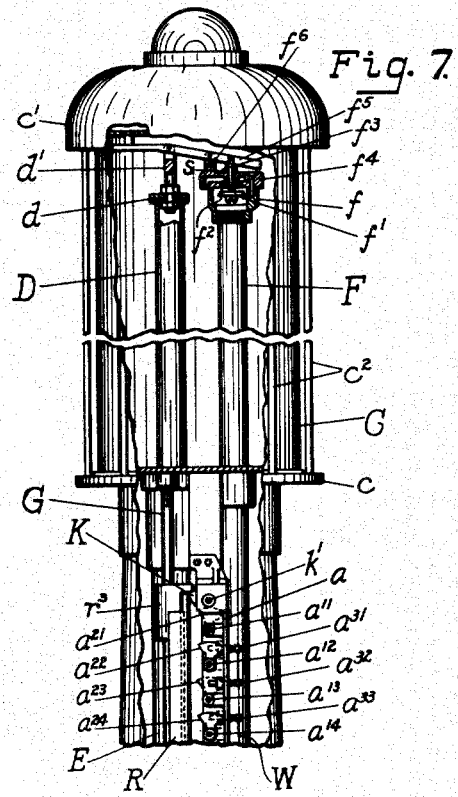
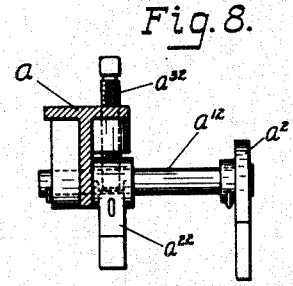
INVENTOR
William F. Brandt
BY
Walter W. Knight
ATTORNEY Patented Apr. 30, 1929.

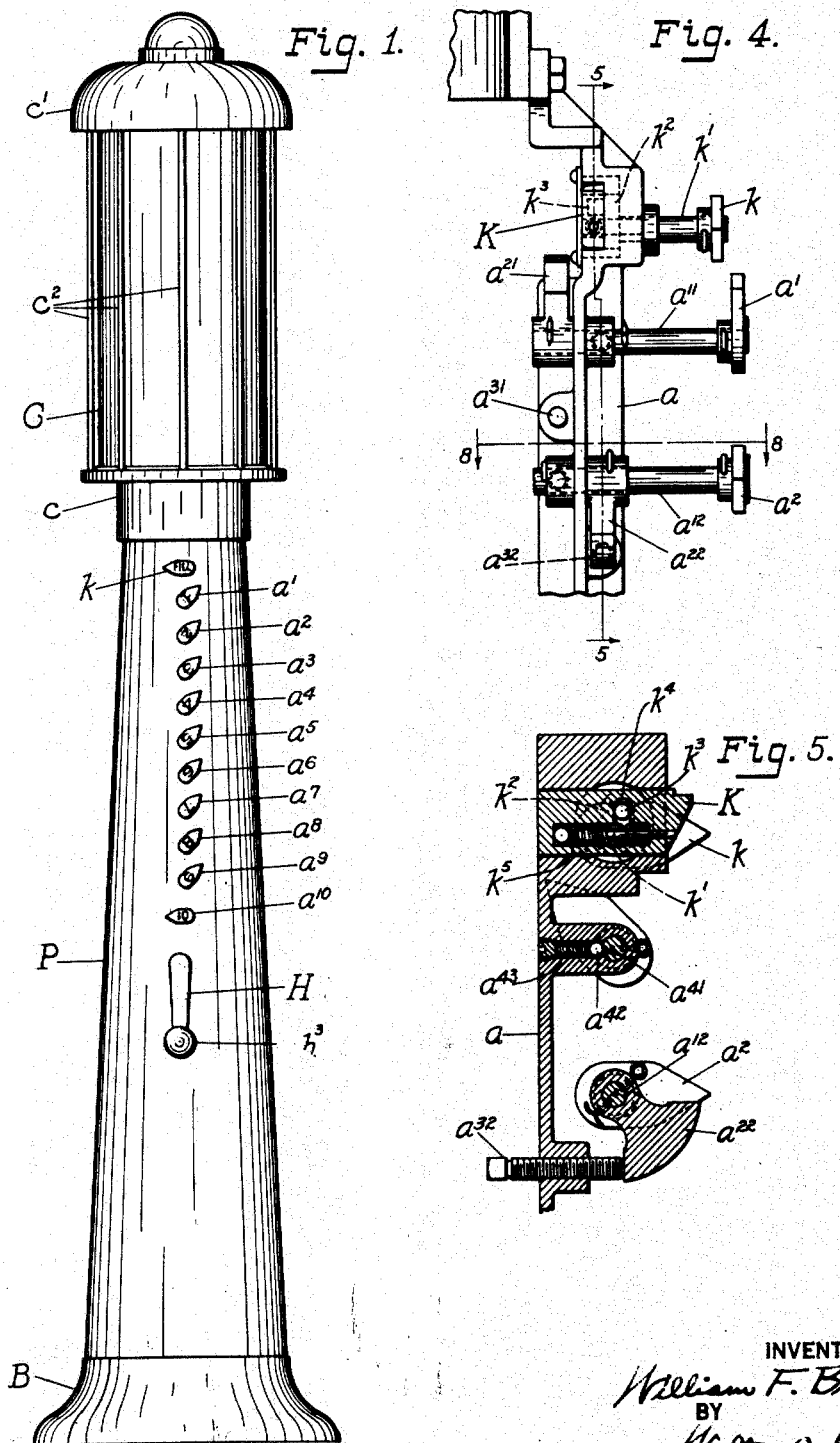

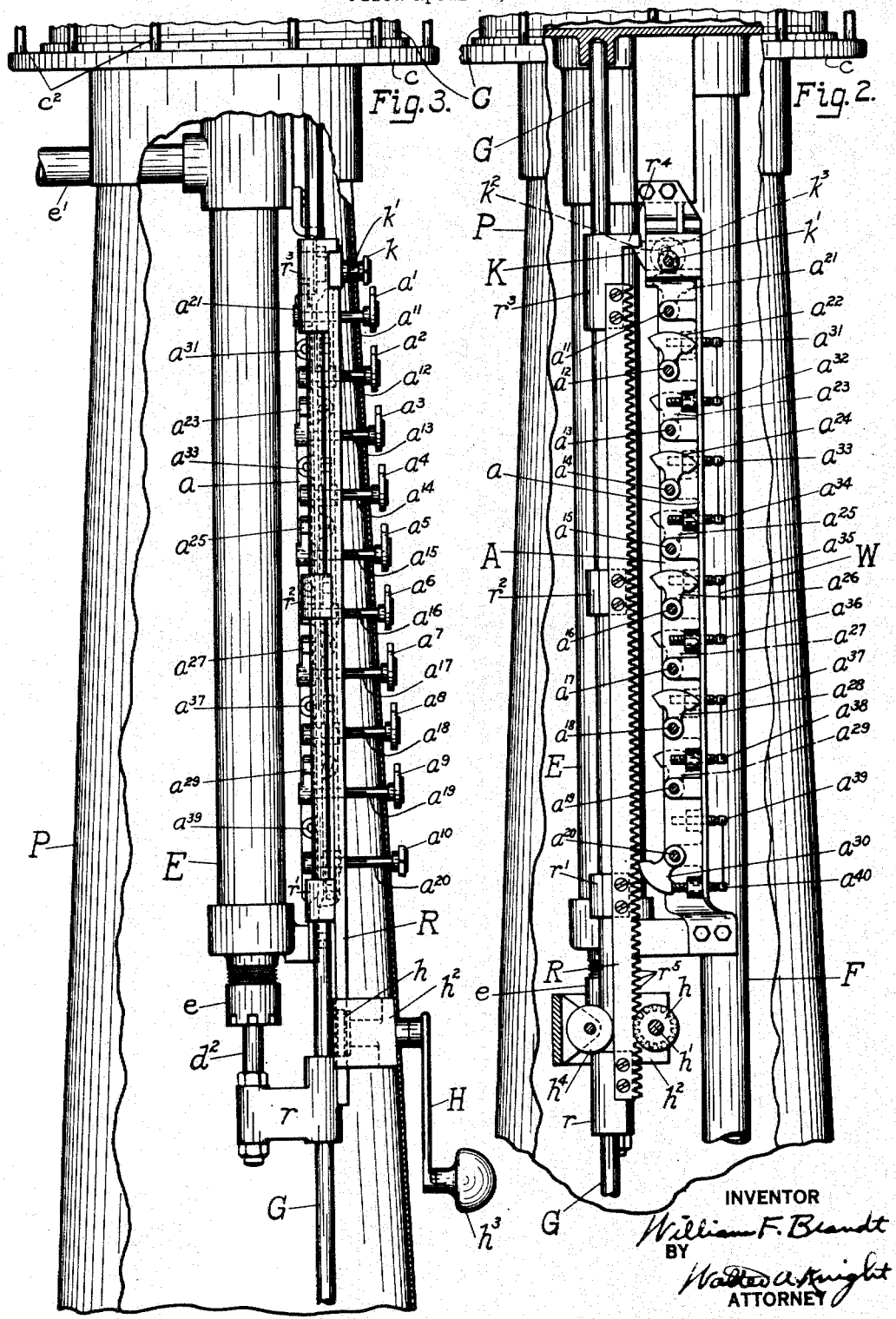

1,710,917

UNITED STATES PATENT OFFICE.

WILLIAM F. BRANDT, OF FORT WAYNE, INDIANA, ASSIGNOR TO WAYNE COMPANY, OF FORT WAYNE, INDIANA, A CORPORATION OF INDIANA.

LIQUID MEASURING AND DISPENSING APPARATUS.

Application filed April 18, 1927. Serial No. 184,664.

My invention relates to quantity stop mechanism for measuring and dispensing apparatus, and is especially adapted for use on apparatus for dispensing gasoline and the like. It may be used on either so-called blind or visible pumps but in blind pumps no fill latch would be used.

There are two kinds of visible pumps on which my invention may be used:—one having a fixed fill pipe and a fixed drain-back pipe with a vertically adjustable serve pipe extending into the elevated reservoir from below and terminating therein, and whose lower end is connected with the serve outlet; the other with a fixed fill pipe and a vertically adjustable drain-back pipe extending into said reservoir from below and terminating therein, and with fixed means for serving from the bottom of the reservoir.

The principal object of my invention is to provide a stop normally out of the path of the rack lug but capable of being rotated into it so that the lug will engage the stop and prevent further travel of the rack in that direction until the stop has been rotated out of contacting position. As in other stop mechanisms, a plurality of such stops is provided so that the apparatus may be set to deliver any desired number of units of the liquid to be dispensed. Means required by sealers of weights and measures for exact adjustment of stop positions, are provided in a fixed contiguous part of the apparatus instead of being carried by the stop itself.

Another object of my invention is to place a quantity indicating numeral on the lever by which each stop is rotated. As the lever rotates with the stop shaft and stop, all quantity numerals are and remain in substantially inverted position except the one on the lever that has been used at the time to rotate that particular stop into lug-engaging position. That numeral is in upright position when its stop is rotated into lug-engaging position, and hence the purchaser's attention is concentrated on that correctly positioned numeral indicating the number of gallons or other units of measure of the liquid to be dispensed to him.

Another object of my invention is to provide automatically operating means for holding the rack in extreme raised position for filling, in which position only the container may be filled, thus preventing the lowering of the rack until a conspicuous act has been performed; viz, the throwing of the fill latch lever, at which time its letters will be inverted while the latch is so held, and the latch will be then temporarily withdrawn so that the rack may be lowered. This will enable the customer to see that the elevated container has been filled before any quantity serve setting has been made.

The particular embodiment of my invention selected for illustration is a so-called visible liquid dispensing apparatus of the type having an adjustable serve pipe, and in which:—

Figure 1 is an elevation thereof on the side which bears the pump crank and stop levers and is shown set to dispense ten gallons;

Fig. 2 is an enlarged view from the same position as Fig. 1 with most of the visible container and the lower portion of the pedestal and base broken away, and the housing pedestal broken away and some interior parts in section to expose to view the stop mechanism and attendant parts;

Fig. 3 is substantially the same as Fig. 2, turned 90° to the right with the casing shown partly in section;

Fig. 4, a further enlarged detail of a portion of Fig. 3, shows the top end of the stop mechanism alone, the two upper stops with their shafts and levers and the fill latch being shown in side view, the lowermost stop being turned to lug-engaging position and the uppermost stop turned so as not to engage the lug;

Fig. 5 is a section on the line 5—5 of Fig. 4;

Fig. 6 is an elevation of the whole apparatus in the same position as Fig. 2, with parts broken away to shorten, and other parts broken away and in section to expose to view the valve mechanism in the elevated container, and the rack lug in contact with the lowest stop;

Fig. 7 is the same, the lower part of the casing, base and enclosed mechanism omitted, but with the rack lug shown in position above the fill latch with which it is in contact; and Fig. 8 is a cross section on the line 8—8 of Fig. 4.

Referring now to the drawings, P is the pedestal resting on the base B and surmounted by the bottom-head $c$ on which rests the transparent elevated liquid container C surmounted by the top-head $c^1$, the container being securely held in position between the top and bottom heads by the tie-rods $c^2$.

F is the fixed fill pipe through which the gasoline flows into the container C, and is provided at the top with a cap $f$ which forms a valve body, the valve $f^1$ being adapted to be closed on the valve seat $f^2$ whenever the spring $s$ on the valve stem $f^3$ between the top of the guide element $f^4$ and the lever $f^5$, is free to raise the valve $f^1$. The lever $f^5$ is pivoted to a forked lug $f^6$ on the guide element $f^4$.

No liquid can flow through the fill pipe into the container C when the valve $f^1$ is closed as shown in Fig. 6, and this is its position at all times except when the top of the vertically adjustable serve pipe D contacts with the valve $d$, and continued raising of the pipe D raises the end of the lever $f^5$ to which the forked valve stem $d^1$ is pivoted. This depresses the opposite end of the lever $f^5$ and opens the valve $f^1$.

The serve pipe D is secured at its lower end to a rod $d^2$ which passes through a stuffing box $e$ which closes the bottom of a well tube E. The liquid dispensed flows through the pipe $e^1$. The rod $d^2$ is secured at its lower end to a bracket $r$ which is bored and loosely pierced by the fixed guide rod G.

A rack R is secured to guides $r$, $r^1$, $r^2$ and $r^3$, all slidably mounted like the bracket $r$ on the guide rod G. The uppermost guide $r^3$ carries a lug $r^4$ which is adapted to contact with and rest upon the fill latch K when the rack R is in extreme raised position, and thus prevent the rack from being lowered. When the rack is to be lowered the latch is retracted by rotating its cam shaft $k^1$ by turning the lever $k$ from the position shown in Fig. 1 to a position similar to that of the lower levers each of which bears a numeral.

By referring to Fig. 5 it will be seen that rotation of the cam shaft $k^1$ and its attached cam $k^2$ causes the pin $k^3$, fixed to a face of the cam $k^2$ and seated in the slot $k^4$ of the latch K, to retract the latch which is normally held in protruded position by the spring $k^5$.

The stop mechanism which is designated as a whole as A, consists of a vertically positioned support $a$ preferably cast in the form of a T in cross section. Levers $a^1$, $a^2$, $a^3$, $a^4$, $a^5$, $a^6$, $a^7$, $a^8$, $a^9$, and $a^{10}$ are fixed to shafts $a^{11}$, $a^{12}$, $a^{13}$, $a^{14}$, $a^{15}$, $a^{16}$, $a^{17}$, $a^{18}$, $a^{19}$, and $a^{20}$ respectively, journalled in the upright of the T support $a$, and to these shafts are fixed stops $a^{21}$, $a^{22}$, $a^{23}$, $a^{24}$, $a^{25}$, $a^{26}$, $a^{27}$, $a^{28}$, $a^{29}$ and $a^{30}$ respectively. The back edges of these stops are adapted to contact with adjustable set screws $a^{31}$, $a^{32}$, $a^{33}$, $a^{34}$, $a^{35}$, $a^{36}$, $a^{37}$, $a^{38}$, $a^{39}$ and $a^{40}$ respectively, and their wrench heads are bored to receive a sealing wire W after the official sealer had adjusted said screws to the proper position. Sealing wires may connect these wrench heads with each other as shown in Fig. 2 or in any other convenient manner.

The stops are preferably placed on opposite sides of the upright of the T support $a$, alternately, where the quantities to be measured are of sufficiently small units to bring them too close together to be operated without interference if all were placed on the same side. Each of the stops has its shaft spotted at $a^{41}$ and a ball $a^{42}$ with spring $a^{43}$ is provided so as to hold the shafts against accidental rotation while they are in either operating position like the lower stop of Fig. 5, or in thrown back position like the upper stop of said figure.

The teeth $r^5$ of the rack R are constantly in mesh with a driving pinion $h$ fixed to the shaft $h^1$ journalled in the supporting bracket $h^2$. The shaft $h^1$ is rotated through the crank H and handle $h^3$. A guide roll $h^4$ bears against the back of the rack R and is journalled in the bracket $h^2$. The rack R is raised or lowered by rotation of the crank H.

I do not wish to be limited to the precise form of mechanism shown but claim as within the spirit of my invention all forms readable on the claims.

I claim as my invention and desire to secure by Letters Patent of the United States:—

1. A liquid measuring and dispensing apparatus having in combination, an elevated liquid container, a fixed fill-pipe terminating upwardly therein, a vertically adjustable pipe also terminating upwardly within said container, a valve to close the top of said fill-pipe, means for keeping said valve normally closed, a valve to close the top of said adjustable pipe, a lever to which said valves are so secured that continued upward movement of the adjustable pipe after its said valve has closed opens the said fill-pipe valve, means secured to the adjustable pipe by which it may be raised and lowered, a lug in fixed relation to said adjustable pipe, a normally protruded latch located in the path of said lug and adapted to allow the lug to pass said latch when traveling upwardly to a point high enough to open said fill-pipe valve, and manually operated means for retracting said latch so that when held retracted said adjustable pipe may be lowered.

2. A liquid measuring and dispensing apparatus having in combination, an elevated liquid container, a fixed fill-pipe terminating upwardly therein, a vertically adjustable pipe also terminating upwardly within said container, a valve close to the top of said fill-pipe, means for keeping said valve normally closed, a valve to close the top of said adjustable pipe, a lever to which said valves are so secured that continued upward movement of the adjustable pipe after its said valve has closed opens the said fill-pipe valve, a rack and pinion for raising and lowering said adjustable pipe, a lug in fixed relation to said rack, a normally protruded latch located in the path of said lug and adapted to allow the lug to pass said latch when traveling upwardly to a point high enough to open said fill-pipe valve, and manually operated means for retracting said latch so that when held retracted said adjustable pipe may be lowered.

3. A liquid measuring and dispensing apparatus having in combination, an elevated liquid container, a fixed fill-pipe terminating upwardly therein, a vertically adjustable pipe also terminating upwardly within said container, a valve to close the top of said fill-pipe, means for keeping said valve normally closed, a valve to close the top of said adjustable pipe, a lever to which said valves are so secured that continued upward movement of the adjustable pipe after its said valve has closed opens the said fill pipe valve, a reciprocating rack secured to said adjustable pipe and a lug fixed to the rack, a bar positioned in proximity to and parallel with said rack adjacent the path of said lug, a plurality of segmental stops, a shaft for each stop journaled in said bar, each stop secured to its shaft to rotate in a vertical plane, a setting lever rotatably secured to each shaft by which said stop may be rotated into or out of the path of said lug and means for maintaining each of said stops against displacement from adjusted position.

In testimony whereof I have hereunto set my hand.

WILLIAM F. BRANDT.